(12) United States Patent
Crowley et al.

(10) Patent No.: US 12,435,077 B2
(45) Date of Patent: Oct. 7, 2025

(54) OXAZOLIDINONE COMPOUND AND METHODS OF USE THEREOF AS AN ANTIBACTERIAL AGENT

(71) Applicant: Merck Sharp & Dohme LLC, Rahway, NJ (US)

(72) Inventors: Brendan M. Crowley, Collegeville, PA (US); Philippe Nantermet, Lansdale, PA (US); David B. Olsen, Lansdale, PA (US); Takao Suzuki, Shanghai (CN); Lihu Yang, Edison, NJ (US); Lanying You, Shanghai (CN)

(73) Assignee: Merck Sharp & Dohme LLC, Rahway, NJ (US)

( * ) Notice: Subject to any disclaimer, the term of this patent is extended or adjusted under 35 U.S.C. 154(b) by 234 days.

(21) Appl. No.: 17/909,834

(22) PCT Filed: Mar. 20, 2021

(86) PCT No.: PCT/US2021/022652
§ 371 (c)(1),
(2) Date: Sep. 7, 2022

(87) PCT Pub. No.: WO2021/188606
PCT Pub. Date: Sep. 23, 2021

(65) Prior Publication Data
US 2024/0208958 A1 Jun. 27, 2024

(30) Foreign Application Priority Data
Mar. 20, 2020 (WO) ................ PCT/CN2020/080359

(51) Int. Cl.
C07D 417/10 (2006.01)
A61K 31/541 (2006.01)
A61K 45/06 (2006.01)
A61P 31/06 (2006.01)

(52) U.S. Cl.
CPC .......... *C07D 417/10* (2013.01); *A61K 31/541* (2013.01); *A61K 45/06* (2013.01); *A61P 31/06* (2018.01)

(58) Field of Classification Search
CPC .................................................. C07D 417/10
USPC ..................................................... 514/227.8
See application file for complete search history.

(56) References Cited

U.S. PATENT DOCUMENTS

| | | | |
|---|---|---|---|
| 4,948,801 A | 8/1990 | Carlson et al. |
| 6,255,304 B1 | 7/2001 | Hester, Jr. |
| 7,157,456 B2 | 1/2007 | Straub |
| 8,575,337 B2 | 11/2013 | Katoh et al. |
| 2002/0022610 A1 | 2/2002 | Batts |
| 2003/0027790 A1 | 2/2003 | Singh |
| 2004/0077626 A1 | 4/2004 | Hester, Jr. et al. |
| 2004/0191326 A1 | 9/2004 | Reo |
| 2011/0190199 A1 | 8/2011 | Brickner et al. |
| 2013/0012554 A1 | 1/2013 | Keum et al. |
| 2013/0259800 A1 | 10/2013 | Persidis |

FOREIGN PATENT DOCUMENTS

| | | |
|---|---|---|
| CA | 2351062 A1 | 6/2000 |
| CN | 101993448 A | 3/2011 |
| CN | 102143748 A | 8/2011 |
| EP | 0352781 A2 | 1/1990 |
| JP | 2003113433 A | 4/2003 |
| JP | 2004203809 A | 7/2004 |
| RU | 2484819 C2 | 6/2013 |
| UA | 88448 C2 | 10/2009 |
| WO | 9309103 A1 | 5/1993 |
| WO | 9507271 A1 | 3/1995 |
| WO | 9710223 A1 | 3/1997 |
| WO | 9737980 A1 | 10/1997 |

(Continued)

OTHER PUBLICATIONS

Balasubramanian, V. et al., Bactericidal Activity and Mechanism of Action of AZD5847, a Novel Oxazolidinone for Treatment of Tuberculosis, Antimicrobial Agents and Chemotherapy, 2014, 495-502, 58.

(Continued)

*Primary Examiner* — Taofiq A Solola
(74) *Attorney, Agent, or Firm* — James T. Corcoran; Catherine D. Fitch

(57) ABSTRACT

The present invention relates to the oxazolidinone compound of Formula (I): and pharmaceutically acceptable salts thereof. The present invention also relates to compositions containing the compound of Formula (I). The invention also provides methods for inhibiting growth of mycobacterial cells as well as a method of treating mycobacterial infections by *Mycobacterium tuberculosis* by administering a therapeutically effective amount of Formula (I) and/or a pharmaceutically acceptable salt thereof, or a composition comprising such compound and/or salt.

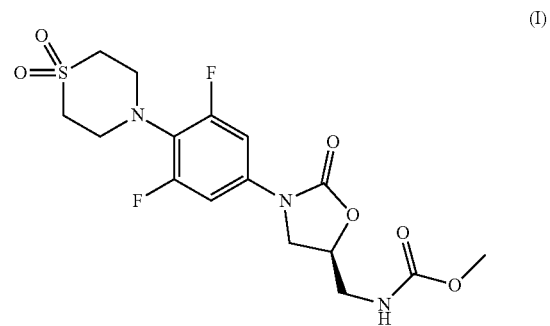

24 Claims, No Drawings

(56) References Cited

FOREIGN PATENT DOCUMENTS

| WO | 9854161 A1 | 12/1998 |
|---|---|---|
| WO | 9959616 A1 | 11/1999 |
| WO | 2000027830 A1 | 5/2000 |
| WO | 200032599 A1 | 6/2000 |
| WO | 2001042229 A1 | 6/2001 |
| WO | 2001046185 A1 | 6/2001 |
| WO | 2001047919 A1 | 7/2001 |
| WO | 2001080841 A2 | 11/2001 |
| WO | 0194342 A1 | 12/2001 |
| WO | 2001098297 A2 | 12/2001 |
| WO | 2002002095 A2 | 1/2002 |
| WO | 2002015940 A2 | 2/2002 |
| WO | 2002030395 A1 | 4/2002 |
| WO | 2002032857 A1 | 4/2002 |
| WO | 2002072066 A1 | 9/2002 |
| WO | 2002080841 A2 | 10/2002 |
| WO | 2002085849 A2 | 10/2002 |
| WO | 2002085865 A1 | 10/2002 |
| WO | 2003000256 A1 | 1/2003 |
| WO | 2003006440 A2 | 1/2003 |
| WO | 2003006441 A1 | 1/2003 |
| WO | 2003024528 A1 | 3/2003 |
| WO | 2003062231 A1 | 7/2003 |
| WO | 2003063862 A1 | 8/2003 |
| WO | 2003072081 A1 | 9/2003 |
| WO | 2003072141 A1 | 9/2003 |
| WO | 2003072575 A1 | 9/2003 |
| WO | 2003093247 A2 | 11/2003 |
| WO | 2004002967 A1 | 1/2004 |
| WO | 2004014897 A1 | 2/2004 |
| WO | 2004026848 A1 | 4/2004 |
| WO | 2005005398 A2 | 1/2005 |
| WO | 2005005420 A1 | 1/2005 |
| WO | 2005011320 A1 | 2/2005 |
| WO | 2005019214 A1 | 3/2005 |
| WO | 2005028473 A1 | 3/2005 |
| WO | 2005099353 A2 | 10/2005 |
| WO | 2005113520 A1 | 12/2005 |
| WO | 2006008754 A1 | 1/2006 |
| WO | 2006010756 A1 | 2/2006 |
| WO | 2006022794 A1 | 3/2006 |
| WO | 2006038100 A1 | 4/2006 |
| WO | 2006059221 A1 | 6/2006 |
| WO | 2006079896 A2 | 8/2006 |
| WO | 2007000432 A1 | 1/2007 |
| WO | 2007023507 A3 | 3/2007 |
| WO | 2007039134 A1 | 4/2007 |
| WO | 2007042146 A1 | 4/2007 |
| WO | 2008052671 A2 | 5/2008 |
| WO | 2008069619 A1 | 6/2008 |
| WO | 2008070619 A1 | 6/2008 |
| WO | 2009020616 A1 | 2/2009 |
| WO | 2009157423 A1 | 12/2009 |
| WO | 2010026526 A1 | 3/2010 |
| WO | 2010084514 A2 | 7/2010 |
| WO | 2012082992 A1 | 6/2012 |
| WO | 2017070024 A1 | 4/2017 |
| WO | 2017143112 A2 | 8/2017 |
| WO | 2017145112 A1 | 8/2017 |
| WO | 2018170664 A1 | 9/2018 |
| WO | 2018175185 A1 | 9/2018 |
| WO | 2020049309 A1 | 3/2020 |
| WO | 2020147504 A1 | 7/2020 |

OTHER PUBLICATIONS

Bandyopadhyay, Rebanta et al., Application of Powder X-Ray Diffraction in Studying the Compaction Behavior of Bulk Pharmaceutical Powders, Journal of Pharmaceutical Sciences, 2005, 2520-2530, 94(11).
Barbachyn, Michael R. et al., Identification of a Novel Oxazolidinone (U-100480) with Potent Antimycobacterial Activity, J. Med. Chem., 1996, 680-685, 39.
Belikov, V.G., Pharmaceutical Chemistry, Moscow MEDpress-inform, 2007, 27-29, 4th Edition.
Bloom, Barry R. et al., The Evolving Relation Between Humans and *Mycobacterium tuberculosis*, The New England Journal of Medicine, 1998, 677-678, 338.
Flanagan, Shawn, et al., Nonclinical and Pharmacokinetic Assessments to Evaluate the Potential of Tedizolid and Linezolid to Affect Mitochondrial Function, Antimicrobial Agents and Chemotherapy, 2015, p. 178-185, vol. 59, No. 1.
Hickey et al., Experimental model of reversible myelosuppression caused by short-term, high-dose oxazolidinone administration, Therapy, 2006, 521-526, 3(4).
Huh, Yeamin et al., Interspecies scaling and prediction of human clearance: comparison of small- and macro-molecule drugs, Xenobiotica, 2010, 972-987, 41(11).
Hurdle, Julian G. et al., A microbiological assessment of novel nitrofuranylamides as anti-tuberculosis agents, Journal of Antimicrobial Chemotherapy, 2008, 1037-1045, 62.
ICAAC 2014—A-026b—Relationship between Linezolid (LZD) Exposure Profiles and Toxicity in the Hollow Fiber Infection Model (HFIM) System.
Kaufmann, Stefan H.E. et al., Tuberculosis: a neglected disease strikes back, Trends in Microbiology, 1993, 2-5, 1.
Kim, J. et al., Synthesis and structure-activity studies of novel homomorpholine oxazolidinone antibacterial agents, Bioorg. Med. Chem. Lett., 2009, 550-553, 19.
Lai, Yurong et al., Preclinical and Clinical Evidence for the Collaborative Transport and Renal Secretion of an Oxazolidinone Antibiotic by Organic Anion Transporter 3 (OAT3/SLC22A8) and Multidrug and Toxin Extrusion Protein 1 (MATE1/SLC47A1), Journal of Pharmacology and Experimental Therapeutics, 2010, 936-944, 334(3).
Lee, Myungsun, Linezolid for Treatment of Chronic Extensively Drug-Resistant Tuberculosis, The New England Journal of Medicine, 2012, p. 1508-1518, vol. 367, No. 16.
Li, Yun et al., Computational Approach to Drug Design for Oxazolidinones as Antibacterial Agents, Medicinal Chemistry, 2007, 576-582, 3.
Lu, Cuong V. et al., Development of a Pilot-Scale Preparation of N-[[(5S)-3-[4-(1, 1-Dioxido-4-thiomorpholinyl)-3,5-difluorophenyl]-2-oxo-5-oxazolidinyl]methyl]acetamide, PNU-288034, an Oxazolidinone Antibacterial Agent, Organic Process Research & Development, 2006, 272-277, 10.
Maroju, Sreedhar, et al., Synthesis of Novel Potential DNA Cross Lining New Anti Neoplastic Alkylating Agents, Journal of Applicable Chemistry, 2014, p. 2573-2585, vol. 3, No. 6.
Mitton-Fry, Mark J. et al., Current Approaches to Tuberculosis Drug Discovery and Development, RSC Drug Discovery Series, 2011, 228-261, Chapter 9.
Perrault, William R. et al., The Synthesis of N-Aryl-5(S)-aminomethyl-2-oxazolidinone Antibacterials and Derivatives in One Step from Aryl Carbamates, Organic Process Research & Development, 2003, 533-546, 7.
Pubchem, Substance Record for SID 129430895, Create Date : Jun. 14, 2012.
Renslo, Adam R. et al., Synthesis and structure-activity studies of antibacterial oxazolidinones containing dihydrothiopyran or dihydrothiazine C-rings, Bioorganic & Medicinal Chemistry Letters, 2006, 3475-3478, 16.
Sbardella, Gianluca et al., Synthesis and in vitro antimycobacterial activity of novel 3-(1H-pyrrol-1-yl)-2-oxazolidinone analogues of PNU-100480, Bioorganic & Medicinal Chemistry Letters, 2004, 1537-1541, 14.
Shaw et al., The oxazolidinones: past, present, and future, Ann. N.Y. Acad. Sci., 2011, 48-70, 1241.
Sheridan, RP, The Most Common Chemical Replacements in Drug-Like Compounds, J. Chem. Inf. Comp. Sci., 2002, 103-108, 42.
Singh, Upinder et al., New Antibacterial Tetrahydro-4(2H)-thiopyran and Thiomorpholine S-Oxide and S,S-Dioxide Phenyloxazolidinones, Bioorganic & Medicinal ChemistryLetters, 2003, 4209-4212, 13.

(56) References Cited

OTHER PUBLICATIONS

Suzuki, Hideyuki, et al., Potent Oxazolidinone Antibacterials with Heteroaromatic C-Ring Substructure, ACS Medicinal Chemistry Letters, 2013, p. 1074-1078, vol. 4.
Tokuyama, Ryukou et al., Structure-Activity Relationship (SAR) Studies on Oxazolidinone Antibacterial Agents. 3. 1) Synthesis and Evaluation of 5-Thiocarbamate Oxazolidinones, Chem. Pharm. Bull., 2001, 361-367, 49(4).
Tokuyama, Ryukou et al., Structure-Activity Relationship (SAR) Studies on Oxazolidinone Antibacterial Agents. 2. 1) Relationship between Lipophilicity and Antibacterial Activity in 5-Thiocarbonyl Oxazolidinones, Chem. Pharm. Bull., 2001, 353-360, 49(4).
Translation of the Claims of Japanese Patent Publication JP2004203809.
Translation of the description of Japanese Patent JP2004203809.
Williams, K. N. et al., Promising Antituberculosis Activity of the Oxazolidinone PNU-100480, Antimicrobial Agents and Chemotherapy, 2009, 1314-1319, 53(4).
Yang et al., Discovery of a Teraryl Oxazolidinone Compound (S)-N-((3-(3-Fluoro-4-(4-(pyridin-2-yl)-1H-pyrazol-1-yl) phenyl)-2-oxooxazolidin-5-yl)-methyl)acetamide Phosphate as a Novel Antimicrobial Agent with Enhanced Safety Profile and Efficacies, Journal of Medicinal Chemistry, 2015, 6389-6409, 58.

OXAZOLIDINONE COMPOUND AND METHODS OF USE THEREOF AS AN ANTIBACTERIAL AGENT

CROSS-REFERENCE TO RELATED APPLICATIONS

This application is a U.S. National Phase application under 35 U.S.C. § 371 of PCT Application No. PCT/US2021/022652, filed Mar. 17, 2021, which published as WO 2021/188606 on Sep. 23, 2021, and claims priority under 35 U.S.C. § 365(b) from PCT/CN2020/080359 filed Mar. 20, 2020.

FIELD OF THE INVENTION

The present invention relates to an oxazolidinone compound useful for the treatment of bacterial infections, particularly mycobacterial infections. The invention also relates to methods of use of the oxazolidinone compound for the treatment of mycobacterial infections such as those caused by *Mycobacteria tuberculosis*.

BACKGROUND OF THE INVENTION

*Mycobacterium* is a genus of bacterium, neither truly gram-positive nor truly gram-negative, including pathogens responsible for *tuberculosis* (*M. tuberculosis*) and leprosy (*M. leprae*). *Tuberculosis* (TB), in particular, despite the availability of anti-TB drugs such as isoniazide and rifampin, is considered to be one of the world's deadliest diseases. According to World Health Organization, in 2018, there were 10 million new TB cases and 1.5 million TB deaths. See, Global *Tuberculosis* Report 2019 published by the World Health Organization. Complicating the TB epidemic is the rising tide of multi-drug-resistant strains, and the deadly association with HIV. People who are HIV-positive and infected with TB are 30 times more likely to develop active TB than people who are HIV-negative, and TB is responsible for the death of one out of every three people with HIV/AIDS worldwide. See, e.g., Kaufmann et al., *Trends Microbiol.* 1: 2-5 (1993) and Bloom et al., *N. Engl. J. Med.* 338: 677-678 (1998).

Mycobacteria other than *M. tuberculosis* are increasingly found in opportunistic infections that plague the AIDS patient. Organisms from the *M. avium-intracellulare* complex (MAC), especially serotypes four and eight, account for 68% of the mycobacterial isolates from AIDS patients. Enormous numbers of MAC are found (up to 1010 acid-fast bacilli per gram of tissue), and consequently, the prognosis for the infected AIDS patient is poor.

Oxazolidinones are a class of compounds containing 2-oxazolidone, a 5-membered ring containing nitrogen and oxygen, which are used as antimicrobials. See, e.g. WO 2009157423. In general, oxazolidinones are known to be monoamine oxidase inhibitors and to have activity against gram-positive microorganisms. WO 2006022794, Suzuki et al., *Med.Chem. Lett.* 4:1074-1078 (2013), Yang et al., *J. Med. Chem.* 58:6389-6409 (2015), Shaw et al., Ann. N.Y. Acad. Sci. 1241:48-70 (2011). Additionally, PCT Publication No. WO2017/070024 discloses oxazolidinone antibiotics for the treatemtent of *tuberculosis*.

Several oxazolidinone antibiotics have been approved or are in clinical trials for the treatment of gram-positive bacterial infections such as methicillin resistant *Staphylococcus aureus*. Examples of oxazolidinone antibiotics include linezolid (Zyvox™, Pfizer Inc., New York, NY) and tedizolid (Sivextro™, Merck Sharp & Dohme Corp., Kenilworth, NJ). Tedizolid is used to treat acute bacterial skin and skin structure infections caused by specific susceptible gram-positive bacteria. Linezolid is indicated for the treatment of several infections caused by susceptible strains of gram-positive microorganisms including nosocomial pneumonia, complicated skin and skin structure infections, and community-acquired pneumonia. In addition, it has been tested for the treatment of multi-drug resistant (MDR) and extensively drug-resistant (XDR) *Mycobacterium tuberculosis* (Mtb) in clinical trials. Lee et al., *N. Engl. J. Med* 367: 1508-18 (2012). Despite clinical efficacy in treating these diseases, long-term use of linezolid has been associated with adverse events including myelosuppression (including anemia and leukopenia) (Hickey et al., Therapy 3(4):521-526 (2006), neuropathy, and serotonin syndrome. These adverse events are hypothesized to be associated with the inhibition of mitochondrial protein synthesis. Flanagan et al., *Antimicrobial Agents and Chemotherapy* 59(1): 178-185 (2015).

Development of oxazolidinone antibiotics that are safer than approved oxazolidinones yet at least as effective would greatly benefit Mtb patients.

SUMMARY OF THE INVENTION

The present invention is directed to an oxazolidinone compound which has antibacterial activity. The compound, and its pharmaceutically acceptable salts can be useful, for example, for the treatment of bacterial infections, for example, mycobacterial infections. More particularly, the present invention includes the compound of Formula I, or a pharmaceutically acceptable salt thereof:

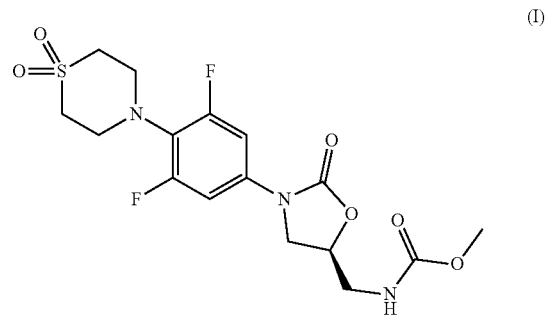 [SMILES: COC(=O)NC[C@H]1CN(c2cc(F)c(N3CCS(=O)(=O)CC3)c(F)c2)C(=O)O1]

(I)

The present invention also relates to a pharmaceutical composition for treating a bacterial infection in a subject, particularly an *M. tuberculosis* infection, comprising the oxazolidinone compound of Formula I and/or a pharmaceutically acceptable carrier, diluent or excipient.

The compound of Formula I and/or pharmaceutically acceptable salts thereof can be useful, for example, for inhibiting the growth of *Mycobacterium tuberculosis*, and/or for treating or preventing *tuberculosis* in a patient. Without being bound by any specific theory, it is believed that uses of the oxazolidinone compound of the invention for the treatment of *tuberculosis* is likely to cause less myelosuppression than known oxazolidinone compounds such as linezolid because they are not associated with a high degree of inhibition of mitochondrial protein synthesis and/or have higher separation between potency against *M. tuberculosis* and inhibition of mitochondrial protein synthesis. Also, the compound described herein demonstrates a pharmacokinetic profile that, in combination with its potency against *M.*

*tuberculosis*, is more likely to offer once-a-day (QD) dosing at reasonable dosages in humans than known oxazolidinones. Additionally, based on its pharmacokinetic profile, the compound described herein is more likely to have a smaller difference between its maximal and minimal concentrations in the body 24 hours after dosing than known oxazolidinones, which could allow for better separation between efficacy and potential adverse effects in the treatment of Mtb.

The present invention is also directed to 1) methods of treating *tuberculosis* in a subject in need of treatment thereof, comprising administering to the subject an effective amount of the oxazolidinone compound of Formula I; and 2) uses of the oxazolidinone compound of Formula I for the treatment of *tuberculosis*.

Embodiments, sub-embodiments and features of the present invention are either further described herein or will be apparent from the ensuing description, examples and appended claims.

DETAILED DESCRIPTION OF THE INVENTION

Oxazolidinones were originally developed for use in treating gram-positive bacterial infections, particularly, methicillin-resistant *S. aureus* infections. As shown in the Examples, in vitro testing of the oxazolidinone compound of Formula I revealed this compound had excellent potency in inhibiting the growth of *Mycobacteria tuberculosis*, but was not associated with a high degree of mitochondrial protein synthesis inhibition. Thus, the compound of Formula I and/or pharmaceutically acceptable salts thereof is expected to be useful for the treatment of *Mycobacterial tuberculosis* (Mtb), yet not lead to the side effects such as myelosuppression that are associated with with the oxazolidinone linezolid. Therefore, the compound of Formula I would have significant advantages over linezolid and analogs as Mtb therapeutic agents.

The Compound of Formula I

Described herein, is the compound of Formula I:

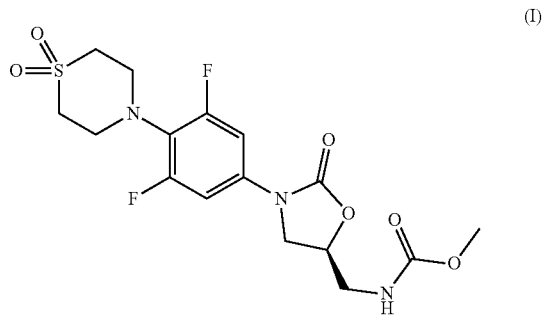 [SMILES: COC(=O)NC[C@H]1CN(c2cc(F)c(N3CCS(=O)(=O)CC3)c(F)c2)C(=O)O1]

Also described herein, is the compound of Formula I:

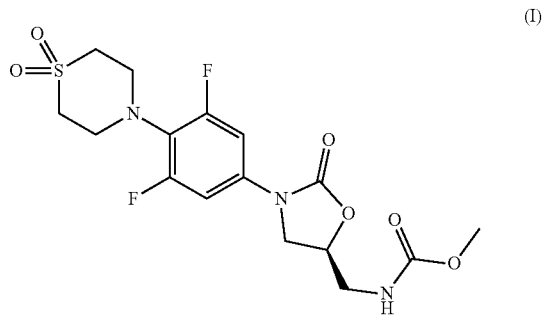 [SMILES: COC(=O)NC[C@H]1CN(c2cc(F)c(N3CCS(=O)(=O)CC3)c(F)c2)C(=O)O1]

and pharmaceutically acceptable salts thereof; wherein the compound may be suitable for use for the treatment of bacterial infections, particularly mycobacterial infections.

Reference to different embodiments with respect to Formula I compounds, specifically includes the compound of Formula I and, optionally, pharmaceutically acceptable salts of the compound of Formula I.

Other embodiments of the present invention include the following:

(a) A pharmaceutical composition comprising an effective amount of a compound of Formula I, as defined herein, or a pharmaceutically acceptable salt thereof, and a pharmaceutically acceptable carrier.

(b) The pharmaceutical composition of (a), further comprising a second compound, wherein the second compound is an antibiotic.

(c) The pharmaceutical composition of (b), wherein the second compound is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, pretomanid, bedaquiline, GSK 3036656, M72/AS01E vaccine, gepotidacin, thiacetazone, meropenem-clavulanate, TBA-7371 a decaprenylphosphoryl-β-D-ribose 2'-oxidase (DprE1) Inhibitor, OPC-167832 from Otsuka Pharmaceutical, Telacebec (Q203) from Qurient Co., Ltd and thioridazine.

(d) A pharmaceutical composition comprising (i) the compound of Formula I, or a pharmaceutically acceptable salt thereof, and (ii) a second compound, wherein the second compound is an antibiotic, wherein the compound of Formula I, and the second compound are each employed in an amount that renders the combination effective for treating or preventing bacterial infection.

(e) The combination of (d), wherein the second compound is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, pretomanid, bedaquiline, GSK 3036656, M72/AS01E vaccine, gepotidacin, thiacetazone, meropenem-clavulanate, TBA-7371 a decaprenylphosphoryl-β-D-ribose 2'-oxidase (DprE1) Inhibitor, OPC-167832 from Otsuka Pharmaceutical, Telacebec (Q203) from Qurient Co., Ltd and thioridazine.

(f) A method for treating a bacterial infection in a subject which comprises administering to a subject in need of such treatment an effective amount of a compound of Formula I, or a pharmaceutically acceptable salt thereof.

(g) A method for preventing and/or treating a bacterial infection which comprises administering to a subject in need of such treatment an effective amount of a compound of Formula I, or a pharmaceutically acceptable salt thereof.

(h) A method for treating a bacterial infection which comprises administering to a subject in need of such treatment a therapeutically effective amount of the composition of (a), (b), (c), (d), or (e).

(i) The method of treating a bacterial infection as set forth in (f), (g), or (h), wherein the bacterial infection is due to *Mycobacterium tuberculosis*.

(j) A method for preventing and/or treating a mycobacterial infection which comprises administering to a subject in need of such treatment an effective amount of a composition comprising the compound of Formula I, or a pharmaceutically acceptable salt thereof.

(k) The method of treating a mycobacterial infection as set forth in (j), wherein the mycobacterial infection is due to *M. tuberculosis*.

(l) The method of treating a mycobacterial infection as set forth in (j), wherein the composition is a composition of (a), (b), (c), (d), or (e).

The present invention also includes a compound of Formula I or a pharmaceutically acceptable salt thereof, (i) for use in, (ii) for use as a medicament for, or (iii) for use in the preparation (or manufacture) of a medicament for, medicine or treating bacterial infection, particularly a mycobacterial infection. In these uses, the compound of the present invention can optionally be employed in combination with one or more second therapeutic agents including ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, pretomanid, bedaquiline, GSK 3036656, M72/AS01E vaccine, gepotidacin, thiacetazone, meropenem-clavulanate, TBA-7371 a decaprenylphosphoryl-β-D-ribose 2'-oxidase (DprE1) Inhibitor, OPC-167832 from Otsuka Pharmaceutical, Telacebec (Q203) from Qurient Co., Ltd and thioridazine.

Additional embodiments of the invention include the pharmaceutical compositions, combinations and methods set forth in (a)-(l) above and the uses set forth in the preceding paragraph, wherein the compound of the present invention employed therein is a compound of one of the embodiments, sub-embodiments, classes or sub-classes described above. The compound may optionally be used in the form of a pharmaceutically acceptable salt in these embodiments.

In the embodiments of the compound and salts provided above, it is to be understood that each embodiment may be combined with one or more other embodiments, to the extent that such a combination provides a stable compound or salt and is consistent with the description of the embodiments. It is further to be understood that the embodiments of compositions and methods provided as (a) through (l) above are understood to include all embodiments of the compound and/or salts, including such embodiments as result from combinations of embodiments.

Additional embodiments of the present invention include each of the pharmaceutical compositions, combinations, methods and uses set forth in the preceding paragraphs, wherein the compound of the present invention or its salt employed therein is substantially pure. With respect to a pharmaceutical composition comprising the compound of Formula I or its salt and a pharmaceutically acceptable carrier and optionally one or more excipients, it is understood that the term "substantially pure" is in reference to the compound of Formula I or its salt per se; i.e., the purity of the active ingredient in the composition.

Definitions and Abbreviations

The terms used herein have their ordinary meaning and the meaning of such terms is independent at each occurrence thereof. That notwithstanding, and except where stated otherwise, the following definitions apply throughout the specification and claims. Chemical names, common names, and chemical structures may be used interchangeably to describe the same structure. If a chemical compound is referred to using both a chemical structure and a chemical name and an ambiguity exists between the structure and the name, the structure predominates. These definitions apply regardless of whether a term is used by itself or in combination with other terms, unless otherwise indicated.

"Antibiotic" refers to a compound or composition which decreases the viability of a microorganism, or which inhibits the growth or proliferation of a microorganism. The phrase "inhibits the growth or proliferation" means increasing the generation time (i.e., the time required for the bacterial cell to divide or for the population to double) by at least about 2-fold. Preferred antibiotics are those which can increase the generation time by at least about 10-fold or more (e.g., at least about 100-fold or even indefinitely, as in total cell death). As used in this disclosure, an antibiotic is further intended to include an antimicrobial, bacteriostatic, or bactericidal agent.

"About", when modifying the quantity (e.g., kg, L, or equivalents) of a substance or composition, or the value of a physical property, or the value of a parameter characterizing a process step (e.g., the temperature at which a process step is conducted), or the like refers to variation in the numerical quantity that can occur, for example, through typical measuring, handling and sampling procedures involved in the preparation, characterization and/or use of the substance or composition; through inadvertent error in these procedures; through differences in the manufacture, source, or purity of the ingredients employed to make or use the compositions or carry out the procedures; and the like. In certain embodiments, "about" can mean a variation of ±0.1, 0.2, 0.3, 0.4, 0.5, 1.0, 2.0, 3.0, 4.0, or 5.0 of the appropriate unit. In certain embodiments, "about" can mean a variation of ±1%, 2%, 3%, 4%, 5%, 10%, or 20%.

"Drug resistant" means, in connection with a *Mycobacterium*, a *Mycobacterium* which is no longer susceptible to at least one previously effective drug; which has developed the ability to withstand antibiotic attack by at least one previously effective drug. A drug resistant strain may relay that ability to withstand to its progeny. Said resistance may be due to random genetic mutations in the bacterial cell that alters its sensitivity to a single drug or to different drugs.

"Tuberculosis" comprises disease states usually associated with infections caused by mycobacteria species comprising *M. tuberculosis* complex. The term "tuberculosis" is also associated with mycobacterial infections caused by mycobacteria other than *M. tuberculosis* (MOTT). Other mycobacterial species include *M. avium-intracellulare, M. kansarii, M. fortuitum, M. chelonae, M. leprae, M. africa-* num, and *M. microti, M. avium paratuberculosis, M. intracellulare, M. scrofulaceum, M. xenopi, M. marinum*, and *M. ulcerans*.

Another embodiment of the present invention is the compound of Formula I, or a pharmaceutically acceptable salt thereof, as originally defined or as defined in any of the foregoing embodiments, sub-embodiments, aspects, classes or sub-classes, wherein the compound or its salt is in a substantially pure form. As used herein "substantially pure" means suitably at least about 60 wt. %, typically at least about 70 wt. %, preferably at least about 80 wt. %, more preferably at least about 90 wt. % (e.g., from about 90 wt. % to about 99 wt. %), even more preferably at least about 95 wt. % (e.g., from about 95 wt. % to about 99 wt. %, or from about 98 wt. % to 100 wt. %), and most preferably at least about 99 wt. % (e.g., 100 wt. %) of a product containing the compound of Formula I or a salt of Formula I (e.g., the product isolated from a reaction mixture affording the compound or salt) consists of the compound or salt. The level of purity of the compounds and salts can be determined using a standard method of analysis such as thin layer chromatography, gel electrophoresis, high performance liquid chromatography, and/or mass spectrometry. If more than one method of analysis is employed and the methods provide experimentally significant differences in the level of purity determined, then the method providing the highest level of purity governs. A compound or salt of 100% purity is one which is free of detectable impurities as determined by a standard method of analysis. With respect to the compound of the invention which has one or more asymmetric centers and can occur as mixtures of stereoisomers, a substantially pure compound can be either a substantially pure mixture of the stereoisomers or a substantially pure individual diastereomer or enantiomer.

In the compound of Formula I, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compound of Formula I. For example, different isotopic forms of hydrogen (H) include protium ($^1$H) and deuterium ($^2$H or D). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds within Formula I can be prepared without undue experimentation by conventional techniques well known to those skilled in the art or by processes analogous to those described in the EXAMPLES herein using appropriate isotopically-enriched reagents and/or intermediates.

The term "compound" refers to the free compound and, to the extent they are stable, any hydrate or solvate thereof. A hydrate is the compound complexed with water, and a solvate is the compound complexed with an organic solvent.

As indicated above, the compound of the present invention can be employed in the form of pharmaceutically acceptable salts. It will be understood that, as used herein, the compound of the instant invention can also include the pharmaceutically acceptable salts, and also salts that are not pharmaceutically acceptable when they are used as precursors to the free compounds or their pharmaceutically acceptable salts or in other synthetic manipulations.

The term "pharmaceutically acceptable salt" refers to a salt which possesses the effectiveness of the parent compound and which is not biologically or otherwise undesirable (e.g., is neither toxic nor otherwise deleterious to the recipient thereof). The term "pharmaceutically acceptable salt" refers to salts prepared from pharmaceutically acceptable non-toxic bases or acids including inorganic or organic bases and inorganic or organic acids. Salts of basic compounds encompassed within the term "pharmaceutically acceptable salt" refer to non-toxic salts of the compound of this invention which are generally prepared by reacting the free base with a suitable organic or inorganic acid. Representative salts of basic compounds of the present invention include, but are not limited to, the following: acetate, ascorbate, adipate, alginate, aspirate, benzenesulfonate, benzoate, bicarbonate, bisulfate, bitartrate, borate, bromide, butyrate, camphorate, camphorsulfonate, camsylate, carbonate, chloride, clavulanate, citrate, cyclopentane propionate, diethylacetic, digluconate, dihydrochloride, dodecylsulfanate, edetate, edisylate, estolate, esylate, ethanesulfonate, formic, fumarate, gluceptate, glucoheptanoate, gluconate, glutamate, glycerophosphate, glycollylarsanilate, hemisulfate, heptanoate, hexanoate, hexylresorcinate, hydrabamine, hydrobromide, hydrochloride, 2-hydroxyethanesulfonate, hydroxynaphthoate, iodide, isonicotinic, isothionate, lactate, lactobionate, laurate, malate, maleate, mandelate, mesylate, methylbromide, methylnitrate, methylsulfate, methanesulfonate, mucate, 2-naphthalenesulfonate, napsylate, nicotinate, nitrate, N-methylglucamine ammonium salt, oleate, oxalate, pamoate (embonate), palmitate, pantothenate, pectinate, persulfate, phosphate/diphosphate, pimelic, phenylpropionic, polygalacturonate, propionate, salicylate, stearate, sulfate, subacetate, succinate, tannate, tartrate, teoclate, thiocyanate, tosylate, triethiodide, trifluoroacetate, undeconate, valerate and the like. Furthermore, where the compound of the invention carry an acidic moiety, suitable pharmaceutically acceptable salts thereof include, but are not limited to, salts derived from inorganic bases including aluminum, ammonium, calcium, copper, ferric, ferrous, lithium, magnesium, manganic, mangamous, potassium, sodium, zinc, and the like. Particularly preferred are the ammonium, calcium, magnesium, potassium, and sodium salts. Salts derived from pharmaceutically acceptable organic non-toxic bases include salts of primary, secondary, and tertiary amines, cyclic amines, dicyclohexyl amines and basic ion-exchange resins, such as arginine, betaine, caffeine, choline, N,N-dibenzylethylenediamine, diethylamine, 2-diethylaminoethanol, 2-dimethylaminoethanol, ethanolamine, ethylamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like. Also, included are the basic nitrogen-containing groups may be quaternized with such agents as lower alkyl halides, such as methyl, ethyl, propyl, and butyl chloride, bromides and iodides; dialkyl sulfates like dimethyl, diethyl, dibutyl; and diamyl sulfates, long chain halides such as decyl, lauryl, myristyl and stearyl chlorides, bromides and iodides, aralkyl halides like benzyl and phenethyl bromides and others.

These salts can be obtained by known methods, for example, by mixing the compound of the present invention with an equivalent amount and a solution containing a desired acid, base, or the like, and then collecting the desired salt by filtering the salt or distilling off the solvent. The compound of the present invention and salts thereof may form solvates with a solvent such as water, ethanol, or glycerol. The compound of the present invention may form an acid addition salt and a salt with a base at the same time according to the type of substituent of the side chain.

As set forth above, the present invention includes pharmaceutical compositions comprising the compound of Formula I of the present invention, optionally one or more other active components, and a pharmaceutically acceptable carrier. The characteristics of the carrier will depend on the route of administration. By "pharmaceutically acceptable" is meant that the ingredients of the pharmaceutical composition must be compatible with each other, do not interfere with the effectiveness of the active ingredient(s), and are not deleterious (e.g., toxic) to the recipient thereof. Thus, compositions according to the invention may, in addition to the inhibitor, contain diluents, fillers, salts, buffers, stabilizers, solubilizers, and other materials well known in the art.

Also as set forth above, the present invention includes a method for treating a bacterial infection which comprises administering to a subject in need of such treatment a therapeutically effective amount of the compound of Formula I, or a pharmaceutically acceptable salt thereof. The term "subject" (or, alternatively, "patient") as used herein refers to an animal, preferably a mammal, most preferably a human, who has been the object of treatment, observation or experiment. The term "administration" and variants thereof (e.g., "administering" a compound) in reference to the compound of Formula I, mean providing the compound, or a pharmaceutically acceptable salt thereof, to the individual in need of treatment. When a compound or a salt thereof is provided in combination with one or more other active agents, "administration" and its variants are each understood to include provision of the compound or its salt and the other agents at the same time or at different times. When the agents of a combination are administered at the same time, they can be administered together in a single composition or they can be administered separately. It is understood that a "combination" of active agents can be a single composition containing all of the active agents or multiple compositions each containing one or more of the active agents. In the case of two active agents a combination can be either a single composition comprising both agents or two separate compositions each comprising one of the agents; in the case of three active agents a combination can be either a single composition comprising all three agents, three separate compositions each comprising one of the agents, or two compositions one of which comprises two of the agents and the other comprises the third agent; and so forth.

The compositions and combinations of the present invention are suitably administered in effective amounts. The term "effective amount" as used herein with respect to the compound of Formula I means the amount of active compound sufficient to cause a bacteriocidal or bacteriostatic effect. In one embodiment, the effective amount is a "therapeutically effective amount" meaning the amount of active compound that can overcome bacterial drug resistance and which is sufficient to inhibit bacterial replication and/or result in bacterial killing. When the active compound (i.e., active ingredient) is administered as the salt, references to the amount of active ingredient are to the free acid or free base form of the compound.

The administration of a composition of the present invention is suitably parenteral, oral, sublingual, transdermal, topical, intranasal, intratracheal, intraocular, or intrarectal, wherein the composition is suitably formulated for administration by the selected route using formulation methods well known in the art, including, for example, the methods for preparing and administering formulations described in chapters 39, 41, 42, 44 and 45 in Remington—The Science and Practice of Pharmacy, $21^{st}$ edition, 2006. In one embodiment, compounds of the invention are administered intravenously in a hospital setting. In another embodiment, administration is oral in the form of a tablet or capsule or the like. The dosage of the compound of the invention and of their pharmaceutically acceptable salts may vary within wide limits and should naturally be adjusted, in each particular case, to the individual conditions and to the pathogenic agent to be controlled. In general, for a use in the treatment of bacterial infections, the daily dose may be between 0.005 mg/kg to 100 mg/kg, 0.01 mg/kg to 10 mg/kg, 0.05 mg/kg to 5 mg/kg, 0.05 mg/kg to 1 mg/kg.

In some embodiments, the daily dose of the compound of the invention may be between 0.005 mg/kg to 100 mg/kg, 0.01 mg/kg to 10 mg/kg, 0.05 mg/kg to 5 mg/kg, 0.05 mg/kg to 1 mg/kg. In some embodiments, the daily dose of the compound of the invention may be between 1 mg/kg to 5 mg/kg. In some embodiments, he daily dose of the compound of the invention may be between 2 mg/kg to 5 mg/kg. In some embodiments, he daily dose of the compound of the invention may be approximately 2.1 to 4.3 mg/kg.

In some embodiments, the compound of the invention is provided in a pharmaceutical formulation for oral, intravenous, intramuscular, nasal, or topical administration. Thus, in some embodiments, the formulation can be prepared in a dosage form, such as but not limited to, a tablet, capsule, liquid (solution or suspension), suppository, ointment, cream, or aerosol. In some embodiments, the presently disclosed subject matter provides such compounds and/or formulations that have been lyophilized and that can be reconstituted to form pharmaceutically acceptable formulations for administration, for example, as by intravenous or intramuscular injection.

Intravenous administration of the compound of the invention can be conducted by reconstituting a powdered form of the compound with an acceptable solvent. Suitable solvents include, for example, saline solutions (e.g., 0.9% Sodium Chloride Injection) and sterile water (e.g., Sterile Water for Injection, Bacteriostatic Water for Injection with methylparaben and propylparaben, or Bacteriostatic Water for Injection with 0.9% benzyl alcohol). The powdered form of the compound can be obtained by gamma-irradiation of the compound or by lyophilization of a solution of the compound, after which the powder can be stored (e.g., in a sealed vial) at or below room temperature until it is reconstituted. The concentration of the compound in the reconstituted IV solution can be, for example, in a range of from about 0.1 mg/mL to about 20 mg/mL.

In some embodiments, the compound of the invention is provided in a pharmaceutical formulation for once a day (QD) dosing. In other embodiments, the compound of the invention is provided in a pharmaceutical formulation for once a day (QD), or less, dosing. In some embodiments, the compound of the invention is provided in a pharmaceutical formulation for once a day (QD), oral dosing. In other embodiments, the compound of the invention is provided in a pharmaceutical formulation for once a day (QD), or less, oral dosing.

The methods of the presently disclosed subject matter are useful for treating these conditions in that they inhibit the onset, growth, or spread of the condition, cause regression of the condition, cure the condition, or otherwise improve the general well-being of a subject afflicted with, or at risk of, contracting the condition. Thus, in accordance with the presently disclosed subject matter, the terms "treat", "treating", and grammatical variations thereof, as well as the phrase "method of treating", are meant to encompass any desired therapeutic intervention, including but not limited to a method for treating an existing infection in a subject, and a method for the prophylaxis (i.e., preventing) of infection, such as in a subject that has been exposed to a microbe as disclosed herein or that has an expectation of being exposed to a microbe as disclosed herein.

Infections that may be treatable by the compound of the invention can be caused by a variety of microbes, including fungi, algae, protozoa, bacteria, and viruses. In some embodiments, the infection is a bacterial infection. Exemplary microbial infections that may be treated by the methods of the invention include, but are not limited to, infections caused by one or more of *Staphylococcus aureaus, Enterococcus faecalis, Bacillus anthracis*, a *Streptococcus* species (e.g., *Streptococcus pyogenes* and *Streptococcus pneumoniae*), *Escherichia coli, Pseudomonas aeruginosa, Burkholderia cepacia*, a *Proteus* species (e.g., *Proteus mirabilis* and *Proteus vulgaris*), *Klebsiella pneumoniae, Acinetobacter baumannii, Strenotrophomonas maltophillia, Mycobacterium tuberculosis, Mycobacterium bovis*, other mycobacteria of the *tuberculosis* complex, and non-*tuberculous* mycobacteria (NTM), including *Mycobacterium ulcerans*.

In certain embodiments, infections that may be treatable by the compound of the invention can be caused by a variety of non-*tuberculous* mycobacteria. Such non-*tuberculous* mycobacteria include over 150 different, including the most clinically relevant NTM species: *Mycobacterium abscessus, Mycobacterium avium* complex (MAC) and *Mycobacterium kansasii*.

In certain embodiments, the infection is an infection of a gram-positive bacterium. In some embodiments, the infection is selected from a mycobacterial infection, a *Bacillus anthracis* infection, an *Enterococcus faecalis* infection, and a *Streptococcus pneumoniae* infection.

In some embodiments, the compound of Formula I is administered prophylactically to prevent or reduce the incidence of one of: (a) a *Mycobacterium tuberculosis* infection in a subject at risk of infection; (b) a recurrence of a *Mycobacterium tuberculosis* infection; and (c) combinations thereof. In some embodiments, the compound of Formula I is administered to treat an existing *Mycobacterium tuberculosis* infection. In some embodiments, the compound of Formula I is administered to treat an infection of a multi-drug resistant strain of *Mycobacterium tuberculosis* (i.e., a strain that is resistant to two or more previously known anti-*tuberculosis* drugs, such as isoniazid, ethambutol, rifampicin, kanamycin, capreomycin, linezolid, and streptomycin). In some embodiments, the compound of Formula I has a minimum inhibitory concentration (MIC) against *Mycobacterium tuberculosis* of 25 µg/mL or less. In some embodiments, the compound of Formula I is administered to treat an infection of a multi-drug resistant strain of *Mycobacterium tuberculosis*.

Thus, the methods of the presently disclosed subject matter can be useful for treating *tuberculosis* in that they inhibit the onset, growth, or spread of a TB infection, cause regression of the TB infection, cure the TB infection, or otherwise improve the general well-being of a subject afflicted with, or at risk of, contracting *tuberculosis*.

Subjects suffering from an *M. tuberculosis* or other *tuberculosis*-related infection can be determined via a number of techniques, e.g., sputum smear, chest X-ray, tuberculin skin test (i.e., Mantoux test or PPD test) and/or the presence of other clinical symptoms (e.g., chest pain, coughing blood, fever, night sweats, appetite loss, fatigue, etc.). If desired, bacterial RNA, DNA or proteins can be isolated from a subject believed to be suffering from TB and analyzed via methods known in the art and compared to known nucleic or amino acid sequences of bacterial RNA, DNA or protein.

In some embodiments, the compound of Formula I has a minimum inhibitory concentration (MIC) against *Mycobacterium tuberculosis* of 25 µg/mL or less. MICs can be determined via methods known in the art, for example, as described in Hurdle et al., 2008, *J. Antimicrob. Chemother.* 62:1037-1045.

In some embodiments, the methods of the invention further comprise administering to the subject an additional therapeutic compound. In some embodiments, the compound of the invention is administered to the subject before, after, or at the same time as one or more additional therapeutic compounds. In some embodiments, the additional therapeutic compound is an antibiotic. In some embodiments, the additional therapeutic compound is an anti-*tuberculosis* therapeutic. In some embodiments, the additional therapeutic compound is selected from the group comprising isoniazid, ethambutol, rifampicin, kanamycin, capreomycin, linezolid, and streptomycin.

The invention thus provides in a further aspect, a combination comprising the compound of Formula I or a pharmaceutically acceptable salt thereof, together with one or more additional therapeutic agents. Examples of such one or more additional therapeutic agents are anti-*tuberculosis* agents including, but not limited to, amikacin, aminosalicylic acid, capreomycin, cycloserine, ethambutol, ethionamide, isoniazid, kanamycin, pyrazinamide, rifamycins (such as rifampin, rifapentine and rifabutin), streptomycin, clarithromycin, azithromycin, oxazolidinones and fluoroquinolones (such as ofloxacin, ciprofloxacin, moxifloxacin and gatifloxacin). Such chemotherapy is determined by the judgment of the treating physician using preferred drug combinations. "First-line" chemotherapeutic agents used to treat a *Mycobacterium tuberculosis* infection that is not drug resistant include isoniazid, rifampin, ethambutol, streptomycin and pyrazinamide. "Second-line" chemotherapeutic agents used to treat a *Mycobacterium tuberculosis* infection that has demonstrated drug resistance to one or more "first-line" drugs include ofloxacin, ciprofloxacin, ethionamide, aminosalicylic acid, cycloserine, amikacin, kanamycin and capreomycin. In addition to the aforementioned, there are a number of new anti-*tuberculosis* therapeutic agents emerging from clinical studies that may also be employed as the one or more additional therapeutic agents in a combination with the compound of Formula I, including, but not limited to, TMC-207, OPC-67683, PA-824, LL-3858 and SQ-109.

Thus, the other antibiotic which may be combined with the compound of Formula I, are for example rifampicin (=rifampin); isoniazid; pyrazinamide; amikacin; ethionamide; moxifloxacin; ethambutol; streptomycin; para-aminosalicylic acid, clofazimine, clarithromycin, amoxicillin-clavulanate, pretomanid, bedaquiline, GSK 3036656, M72/AS01E vaccine, gepotidacin, thiacetazone, meropenem-clavulanate, TBA-7371 a decaprenylphosphoryl-β-D-ribose 2'-oxidase (DprE1) Inhibitor, OPC-167832 from Otsuka Pharmaceutical, Telacebec (Q203) from Qurient Co., Ltd and thioridazine; quinolones/fluoroquinolones such as for example ofloxacin, ciprofloxacin, sparfloxacin; macrolides such as for example clarithromycin, clofazimine, amoxicillin with clavulanic acid; rifamycins; rifabutin; rifapentine.

In a further aspect, the one or more additional therapeutic agent is, for example, an agent useful for the treatment of *tuberculosis* in a mammal, therapeutic vaccines, anti-bacterial agents, anti-viral agents; antibiotics and/or agents for the treatment of HIV/AIDS. Examples of such therapeutic agents include isoniazid (INH), ethambutol, rifampin, pirazinamide, streptomycin, capreomycin, ciprofloxacin and clofazimine.

In one aspect, the one or more additional therapeutic agent is a therapeutic vaccine. The compound of Formula I, or a pharmaceutically acceptable salt thereof, may thus be administered in conjunction with vaccination against mycobacterial infection, in particular vaccination against *Mycobacterium tuberculosis* infection. Existing vaccines against mycobacterial infection include *Bacillus* Calmette Guerin (BCG). Vaccines currently under development for the treatment, prophylaxis or amelioration of mycobacterial infection include: modified BCG strains which recombinantly express additional antigens, cytokines and other agents intended to improve efficacy or safety; attenuated mycobacteria which express a portfolio of antigens more similar to *Mycobacterium tuberculosis* than BCG; and subunit vaccines. Subunit vaccines may be administered in the form of one or more individual protein antigens, or a fusion or fusions of multiple protein antigens, either of which may optionally be adjuvanted, or in the form of a polynucleotide encoding one or more individual protein antigens, or encoding a fusion or fusions of multiple protein antigens, such as where the polynucleotide is administered in an expression vector. Examples of subunit vaccines include, but are not limited to: M72, a fusion protein derived from the antigens Mtb32a and Mtb39; Hy Vac-1, a fusion protein derived from antigen 85b and ESAT-6; HyVac-4, a fusion protein derived from antigen 85b and Tb10.4; MVA85a, a modified vaccinia virus Ankara expressing antigen 85a; and Aeras-402, adenovirus 35 expressing a fusion protein derived from antigen 85a, antigen 85b and Tb10.4.

Abbreviations employed herein include the following:
ACN=acetonitrile; CBZ-Cl=benzyl chloroformate; CDCl$_3$=deuterated chloroform; DCM=dichloromethane; DIAD=diisopropyl diazodicarboxylate, DIEA=N,N-Diisopropylethylamine; DMF=N,N-dimethylformamide; DMSO=dimethyl sulfoxide; Et=ethyl; EtOAc=ethyl acetate; EtOH=ethanol; GFP=green fluorescent protein; HATU=(1-[Bis(dimethylamino)methylene]-1H-1,2,3-triazolo[4,5-b]pyridinium 3-oxid hexafluorophosphate), HET=heterocycle; H$_2$=hydrogen gas, HPLC=high-performance liquid chromatography; LC-MS=liquid chromatography/mass spectrometry; Me=methyl; MeOH=methanol; MIC=minimum inhibitory concentration; MW=molecular weight; MS=mass spectrometry; Mtb=*Mycobacterium tuberculosis*; Pd—C=palladium on carbon; RT=room temperature; TB=*tuberculosis*; TEA=triethylamine; TFA=trifluoroacetic acid; THF=tetrahydrofuran; and TBDMS=tert-butyl dimethylsilyl.

Methods for Making the Compound of Formula I

The compound of Formula I can be prepared according to the following reaction scheme, or modifications thereof, using readily available starting materials, reagents and conventional synthesis procedures. In these reactions, it is also possible to make use of variations which are themselves known to those of ordinary skill in this art, but are not mentioned in greater detail. Alternative synthetic pathways and analogous structures will be apparent to those skilled in the art of organic synthesis in light of the following reaction schemes.

EXAMPLES

Example 1

Synthesis of methyl ({(5S)-3-[4-(1,1-dioxo-1λ$^6$-thiomorpholin-4-yl)-3,5-difluorophenyl]-2-oxo-1,3-oxazolidin-5-yl}methyl)carbamate

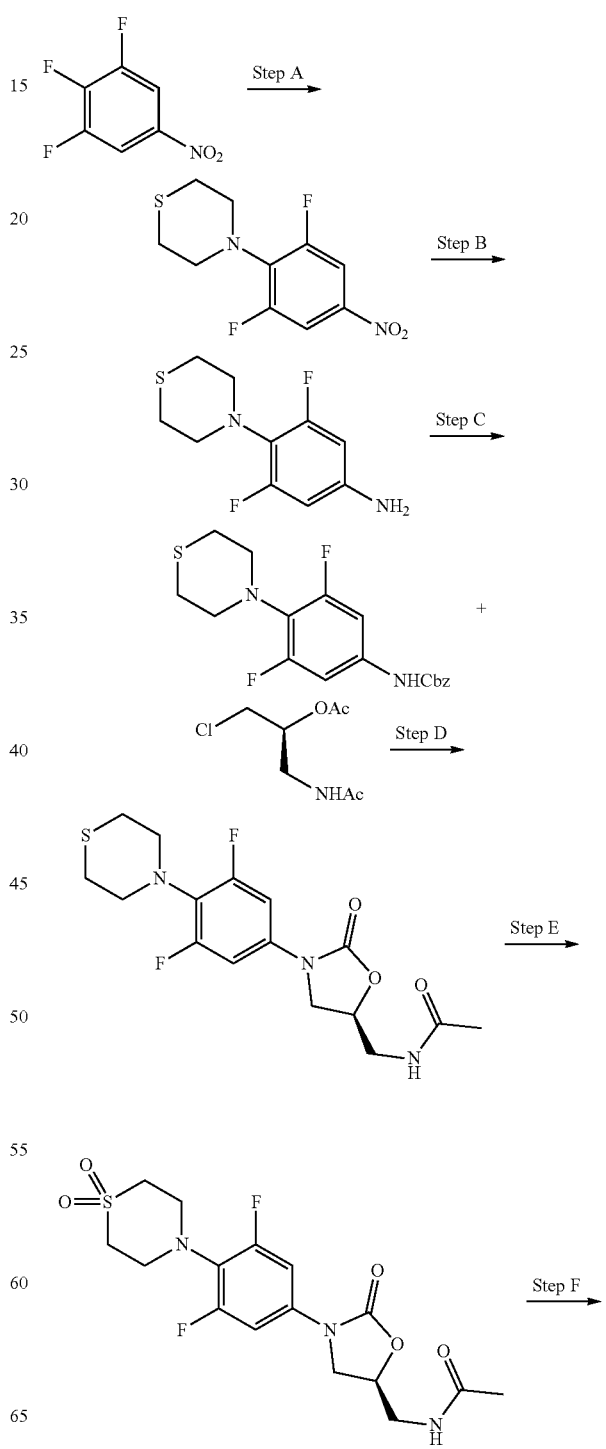

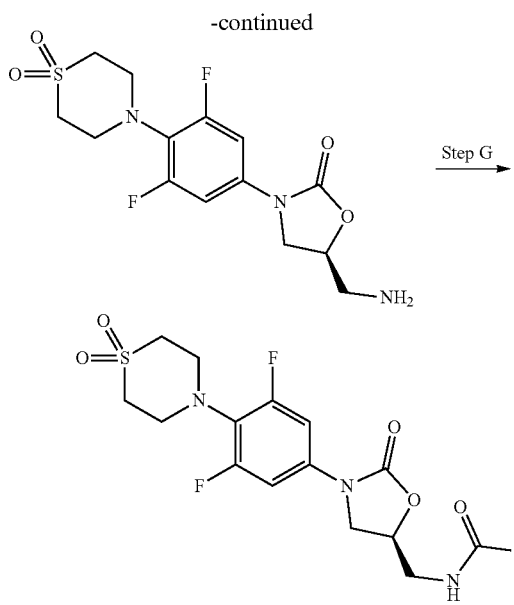

Step A: Synthesis of 4-(2,6-difluoro-4-nitrophenyl)thiomorpholine

N,N-diisopropylethylamine (8.81 mL, 50.8 mmol) and thiomorpholine (1.75 g, 16.9 mmol) were added to a solution of 1,2,3-trifluoro-5-nitrobenzene (3.0 g, 16.9 mmol) in DMF (30 mL). The reaction mixture was warmed to 80° C. and allowed to stir for 2 hours. The reaction mixture was cooled, water (20 mL) was added, and the resulting mixture was extracted with ethyl acetate (3×30 mL). The combined organic layers were washed with a saturated aqueous solution of sodium chloride and dried over sodium sulfate, filtered, and the filtrate was concentrated under reduced pressure to afford the title compound in sufficient purity for use in the next step. $^1$H NMR (400 MHZ, CD$_3$Cl) δ 7.82-7.74 (m, 2 H), 3.59-3.57 (m, 4 H), 2.78-2.75 (m, 4 H).

Step B: Synthesis of 3,5-difluoro-4-(thiomorpholin-4-yl)aniline

Iron (2.64 g, 47.3 mmol), ammonium chloride (2.53 g, 47.3 mmol) and water (10 mL) were added to a solution of 4-(2,6-difluoro-4-nitrophenyl)thiomorpholine (4.1 g, 15.8 mmol) in ethanol (30 mL). The reaction mixture was warmed to 70° C. and allowed to stir for 3 hours. The reaction mixture was cooled and concentrated under reduced pressure. The residue was dissolved in ethyl acetate (50 mL) and dried over sodium sulfate, filtered, and the filtrate concentrated under reduced pressure to afford the title compound in sufficient purity for use in the next step. MS (ESI) m/z: 230.8 [M+H$^+$].

Step C: Synthesis of benzyl[3,5-difluoro-4-(thiomorpholin-4-yl)phenyl]carbamate A solution of sodium bicarbonate (2.48 g, 29.5 mmol) in water (20 mL) was added to a solution of 3,5-difluoro-4-(thiomorpholin-4-yl)aniline (3.4 g, 14.8 mmol) in acetone (20 mL) and the reaction mixture cooled to 0° C. Benzyl chloroformate (3.02 g, 17.7 mmol) was added, and the reaction mixture was allowed to warm to ambient temperature and was stirred for 3 hours. The reaction mixture was concentrated under reduced pressure, and the residue dissolved in ethyl acetate and washed with water. The organic layer was dried over sodium sulfate, filtered, and the filtrate was concentrated under reduced pressure to afford the title compound in sufficient purity for use in the next step. MS (ESI) m/z: 365.3 [M+H$^+$].

Step D: Synthesis of N-({(5S)-3-[3,5-difluoro-4-(thiomorpholin-4-yl)phenyl]-2-oxo-1,3-oxazolidin-5-yl}methyl)acetamide Methanol (0.89 mL, 22 mmol) and lithium tert-butoxide (5.27 g, 65.9 mmol) were added to a solution of benzyl [3,5-difluoro-4-(thiomorpholin-4-yl)phenyl]carbamate (8.0 g, 22 mmol) in tetrahydrofuran (80 mL) at 0° C., and the reaction mixture allowed to stir for 1 hour. (2S)-1-acetamido-3-chloropropan-2-yl acetate (8.50 g, 43.9 mmol) was added and the reaction mixture allowed to warm to ambient temperature and was stirred for 16 hours. The reaction mixture was adjusted to approximately pH 6 by addition of an aqueous solution of HCl (1 M) and concentrated under reduced pressure. The residue was extracted with dichloromethane (3×30 mL), and the combined organic layers were dried over sodium sulfate, filtered, and the filtrate concentrated under reduced pressure. The residue was purified by silica gel column chromatography, eluting with a gradient of ethyl acetate: petroleum ether—1:50 to 100:0 to afford the title compound. MS (ESI) m/z: 371.9 [M+H$^+$].

Step E: Synthesis of N-({(5S)-3-[4-(1,1-dioxo-1λ$^6$-thiomorpholin-4-yl)-3,5-difluorophenyl]-2-oxo-1,3-oxazolidin-5-yl}methyl)acetamide A solution of oxone (3.10 g, 5.05 mmol) in water (15 mL) was added to a solution of N-({(5S)-3-[3,5-difluoro-4-(thiomorpholin-4-yl)phenyl]-2-oxo-1,3-oxazolidin-5-yl}methyl)acetamide (1.5 g, 4.04 mmol) in methanol (25 mL) at 0° C., and the reaction mixture was allowed to warm to ambient temperature and was stirred for 4 hours. A saturated aqueous solution of sodium sulfite (20 mL) was added and the mixture was concentrated under reduced pressure. The residue was extracted with dichloromethane (3×30 mL) and the combined organic layers were dried over sodium sulfate, filtered, and the filtrate was concentrated under reduced pressure to afford the title compound in sufficient purity for use in the next step. MS (ESI) m/z: 404.1 [M+H$^+$].

Step F: Synthesis of 4-{4-[(5S)-5-(aminomethyl)-2-oxo-1,3-oxazolidin-3-yl]-2,6-difluorophenyl}-1λ$^6$-thiomorpholine-1,1-dione Water (3 mL) and a concentrated aqueous solution of HCl (12 N, 3 mL) were added to a solution of N-({(5S)-3-[4-(1,1-dioxo-1λ$^6$-thiomorpholin-4-yl)-3,5-difluorophenyl]-2-oxo-1,3-oxazolidin-5-yl}methyl)acetamide (1.6 g, 3.97 mmol) in methanol (12 mL). The reaction mixture was warmed to 70° C. and allowed to stir for 1.5 days. The reaction mixture was cooled and concentrated under reduced pressure to afford the title compound in sufficient purity for use in the next step. MS (ESI) m/z: 361.8 [M+H$^+$].

Step G: Synthesis of methyl ({(5S)-3-[4-(1,1-dioxo-1λ$^6$-thiomorpholin-4-yl)-3,5-difluorophenyl]-2-oxo-1,3-oxazolidin-5-yl}methyl)carbamate N,N-diisopropylethylamine (0.196 ml, 1.13 mmol) and methyl chloroformate (0.032 mL, 0.415 mmol) were added to a solution of 4-{4-[(5S)-5-(aminomethyl)-2-oxo-1,3-oxazolidin-3-yl]-2,6-difluorophenyl}-1λ6-thiomorpholine-1,1-dione (150 mg, 0.377 mmol) in dichloromethane (2 mL) at 0° C. The reaction mixture was allowed to warm to ambient temperature and allowed to stir for 1 hour. The reaction mixture was concentrated under reduced pressure, and the residue purified by preparative HPLC, eluting with a gradient of acetonitrile: water containing 0.1% trifluoroacetic acid—15:85 to 45:55 to afford the title compound. MS (ESI) m/z: 419.9 [M+H$^+$]. $^1$H NMR (DMSO-d$_6$, 400 MHz): δ 7.52-7.50 (m, 1 H), 7.34-7.27 (m, 2 H), 4.74-4.71 (m, 1 H), 4.11-4.07 (m, 1 H), 3.75-3.71 (m, 1 H), 3.54 (s, 3 H), 3.48-3.40 (m, 4 H), 3.35-3.34 (m, 2 H), 3.23-3.22 (m, 4 H).

BIOLOGICAL ASSAYS

*Mycobacterium tuberculosis* (Mtb) Growth Assay

Inhibition of *Mycobacterium tuberculosis* (Mtb) growth was assessed on two in vivo-relevant carbon sources, glucose and cholesterol, at pH 6.8. For glucose as a carbon source, the media consisted of Middlebrook 7H9 broth supplemented with 4 g/L glucose, 0.08 g/L NaCl, 5 g/L BSA fraction V and 0.05% tyloxapol. For cholesterol as a carbon source, the media consisted of Middlebrook 7H9 broth supplemented with 97 mg/L cholesterol, 0.08 g/L NaCl, 5 g/L BSA fraction V and 0.05% tyloxapol. Mtb expressing green fluorescent protein (Mtb-GFP; H37Rv pMSP12::GFP) was pre-adapted to growth on the relevant carbon source in Middlebrook 7H9-broth base supplemented with bovine serum albumin and tyloxapol prior to the screen. Bacteria were dispensed into 384-well microtiter plates at approximately 2×10$^4$ actively growing cells in 24 μL volumes per well. Microtiter plates were pre-dispensed with 0.2 μL compound, dimethylsulfoxide (negative control) or rifampicin (25 μM; positive control). Cells were exposed to 2-fold serial dilutions of compounds from 50 μM to 0.049 μM. In some experiments, compounds were tested at lower concentrations. Growth inhibition was assessed after a 7-day growth period by measuring fluorescence using a spectrophotometer. In negative control wells, cells were still actively growing at the time of readout. The lowest concentration of test compound required to inhibit 95% of the growth of the bacteria was defined as the MITC95. All studies were done in a BSL3 facility.

Mitochondrial Protein Synthesis Assay

Inhibition of mitochondrial protein synthesis was assessed in HepG2 cells by comparing the levels of two subunits of oxidative phosphorylation enzyme complexes, subunit I of Complex IV (COX-I) and the 70 kDa subunit of Complex II (SDH-A). COX-I is mitochondrial DNA encoded and SDH-A is nuclear DNA encoded. HepG2 cells were seeded in 96-well collagen coated plates at 8,000 cells per well and exposed to 2-fold serial dilutions of compounds from 100 uM to 6.25 μM. Microtiter plates were incubated for approximately 5 replication cycles (4 days) prior to assessment of protein levels using a kit as described by the manufacturer (ab110217 MitoBiogenesis In Cell ELISA Kit, Abcam, Cambridge, MA). Inhibition of mitochondrial protein synthesis was expressed as a ratio of COX-1 to SDH-A levels and a ratio of COX-1 to total viable cell amount (determined by Janus Green (JG) staining).

| Example | Mtb Cho MITC95_μM | Mtb Glu MITC95_μM | MPS IC$_{50}$_μM |
|---|---|---|---|
| 1 | 1.16 | 0.71 | 98 |
| linezolid | 3.14 | 4.58 | 8 |

PHARMACOKINETIC EXPERIMENTS

Rat IV and PO Single Experiments

Plasma pharmacokinetic parameters for clearance, volume of distribution, half-life and oral bioavailability were determined in rats from oral administration and IV administration studies. 4 male rats, typically weighing 225-260 gram, were fasted overnight prior to dosing. Compounds were prepared for oral and IV dosing by addition to a vehicle, depending on the dose used. For a typical preparation, 1 mg per mL (IV) or 1.5 mg per mL (oral) of test compound was added to vehicle comprised of 20% dimethyl sulfoxide (DMSO), 60% polyethylene glycol 400 (PEG400) and 20% water. Intravenous (IV) formulation was administered to two rats via pre-cannulated jugular vein, and oral dosing was administered to two rats via oral gavage. Blood was collected by pre-cannulated artery, typically at predose, 2, 8, 15, 30 min, 1, 2, 4, 6, and 8 hours post-dose for IV, and at predose, 15, 30 mins, 1, 2, 4, 6, 8 hours for oral dosing. Samples were collected in K$_2$EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound. Plasma pharmacokinetic parameters were calculated for IV and oral dosing data by non-compartmental methods. Oral bioavailability was determined as the ratio of the dose-normalized plasma area under the curve (AUC) following oral dosing vs. IV dosing.

Rat IV Cassette Experiments

Plasma pharmacokinetic parameters for clearance, volume of distribution, half-life and mean residence time (MRT) were determined in rats from IV cassette administration studies. Two male rats typically weighing 225-260 gram, were fasted overnight prior to dosing. Compounds were prepared for IV dosing by addition to a vehicle, depending on the dose used. For a typical preparation, 1 mg per mL (IV) of up to 5 test compounds were added to vehicle comprised of 20% dimethyl sulfoxide (DMSO), 60% polyethylene glycol 400 (PEG400) and 20% water. IV formulation was administered to two rats via pre-cannulated jugular vein. Blood was collected by pre-cannulated artery, typically at predose, 2, 8, 15, 30 mins, 1, 2, 4, 6, and 8 hours postdose. Samples were collected in K$_2$EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound. Plasma pharmacokinetic parameters were calculated by non-compartmental methods.

Dog IV and PO Single Experiments

Plasma pharmacokinetic parameters for clearance, volume of distribution, half-life, mean residence time (MRT)

and oral bioavailability were determined in dogs from oral administration and IV administration studies. Four male dogs, typically weighing 8-12 kilograms, were fasted overnight prior to dosing. Compounds were prepared for oral and IV dosing by addition to a vehicle, depending on the dose used. For a typical preparation, 1 mg per mL (IV) or 1.5 mg per mL (oral) of test compound was added to vehicle comprised of 20% dimethyl sulfoxide (DMSO), 60% polyethylene glycol 400 (PEG400) and 20% water. IV formulation was administered to two dogs via the saphenous or cephalic vein, and oral dosing was administered to two dogs via oral gavage. Blood was collected by the cephalic or jugular vein, typically at predose, 2, 8, 15, 30 mins, 1, 2, 4, 6, 8 and 24 hours post-dose for IV, and at predose, 15, 30 mins, 1, 2, 4, 6, 8, and 24 hours for oral dosing. Samples were collected in $K_2$EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound. Plasma pharmacokinetic parameters were calculated for IV and oral dosing data by non-compartmental methods. Oral bioavailability was determined as the ratio of the dose-normalized plasma area under the curve (AUC) following oral dosing verses IV dosing.

Dog IV Cassette Experiments

Plasma pharmacokinetic parameters for clearance, volume of distribution, half-life, and mean residence time (MRT) were determined in dogs from IV cassette administration studies. Two male dogs, typically weighing 8-12 kilograms, were fasted overnight prior to dosing. Compounds were prepared for IV dosing by addition to a vehicle, depending on the dose used. For a typical preparation, 1 mg per mL (IV) of up to 5 test compounds were added to vehicle comprised of 20% dimethyl sulfoxide (DMSO), 60% polyethylene glycol 400 (PEG400) and 20% water. IV formulation was administered to two dogs via the saphenous or cephalic vein. Blood was collected by the cephalic or jugular vein, typically at predose, 2, 8, 15, 30 mins, 1, 2, 4, 6, 8 and 24 hours post-dose. Samples were collected in $K_2$EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound. Plasma pharmacokinetic parameters were calculated by non-compartmental methods.

Plasma Protein Binding Experiments

Binding of compounds to plasma proteins from rat and dog was determined by equilibrium dialysis of the appropriate species plasma at 37° C. for 4 hours in the presence of 2.5 uM of test compound. Plasma samples were precipitated and separated by centrifugation. The supernatant was analyzed by mass spec detection (LC-MS/MS), using a standard curve for each compound. The fraction of unbound compound was calculated per the following:

Fraction Unbound ($f_u$)=Peak Area Ratio$_{buffer}$/Peak Area Ratio$_{plasma}$ where Peak Area Ratio$_{buffer}$=Peak area ratio of analyte/internal standard in buffer Peak Area Ratio$_{plasma}$=Peak area ratio of analyte/internal standard in plasma

| Example | Rat Cl (mL/min/kg) | Rat $V_{d,ss}$ (L/kg) | Rat MRT (h) | Rat $f_u$ | Dog Cl (mL/min/kg) | Dog $V_{d,ss}$ (L/kg) | Dog MRT (h) | Dog $f_u$ |
|---|---|---|---|---|---|---|---|---|
| 1 | 8.5 | 0.9 | 1.7 | 0.42 | 1.9 | 1.4 | 12.6 | 0.69 |

PCT Publication No. WO2017/070024 discloses oxazolidinone antibiotics for the treatemtent of *tuberculosis*. The compound described herein has highly favorable pharmacokinetic properties as compared to earlier disclosed analogs, pharmaceutical compositions comprising them and their use in therapy. Pharmacokinetic properties of oxazolidinone antibiotics discolsed in PCT Publication No. WO2017/070024 are shown in the following table:

| Example # from WO2017/070024 | Structure | Rat Cl (mL/min/kg) | Rat $V_{d,ss}$ (L/kg) | Rat MRT (h) | Rat $f_u$ |
|---|---|---|---|---|---|
| 48 | | 85 | 2.5 | 0.5 | 0.83 |

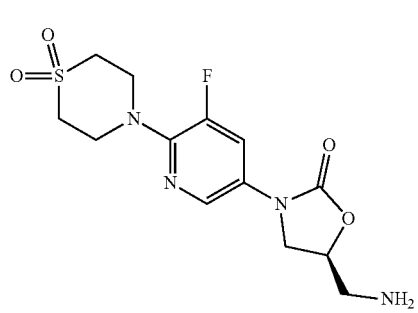 [SMILES: NC[C@H]1CN(c2cnc(N3CCS(=O)(=O)CC3)c(F)c2)C(=O)O1]

| Example # from WO2017/ 070024 | Structure | Dog Cl (mL/min/kg) | Dog $V_{d,ss}$ (L/kg) | Dog MRT (h) | Dog $f_u$ |
|---|---|---|---|---|---|
| 59 | 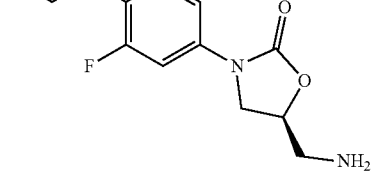 | 43 | 2.0 | 0.8 | 0.57 |
| 48 | 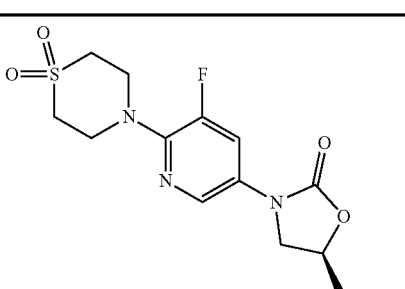 | 18 | 1.5 | 1.3 | 0.87 |
| 59 | 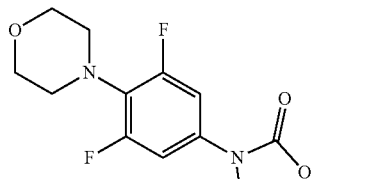 | 53 | 4.2 | 1.3 | 0.81 |

As shown in the table above, the compound of Formula I has a pharmacokinetic profile that better correlatees with the likelihood of QD dosing at a reasonable dose.

What is claimed is:

1. A compound of Formula I (I)

or a pharmaceutically acceptable salt thereof.

2. A pharmaceutical composition which comprises a therapeutically effective amount of the compound of claim 1, or a pharmaceutically acceptable salt thereof, and a pharmaceutically acceptable carrier.

3. A method for treating a bacterial infection which comprises administering to a subject in need of such treatment a therapeutically effective amount of the compound of claim 1, or a pharmaceutically acceptable salt thereof.

4. A method for treating a bacterial infection which comprises administering to a subject in need of such treatment the pharmaceutical composition according to claim 2.

5. The method of claim 3, wherein the bacterial infection is due to *Mycobacterium tuberculosis*.

6. The method of claim 4, wherein the bacterial infection is due to *Mycobacterium tuberculosis*.

7. The method of claim 3, wherein the compound or the pharmaceutically acceptable salt thereof is administered orally, parenterally, or topically.

8. The method of claim 4, wherein the pharmaceutical composition is administered orally, parenterally, or topically.

9. The method of claim 5, wherein the *Mycobacterium tuberculosis* is a drug resistant mycobacterial strain.

10. The method of claim 6, wherein the *Mycobacterium tuberculosis* is a drug resistant mycobacterial strain.

11. The method of claim 5, further comprising the step of administering a second therapeutic agent for treating *Mycobacterium tuberculosis*.

12. The method of claim 11, wherein the second therapeutic agent is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, pretomanid, bedaquiline, GSK 3036656, gepotidacin, thiacetazone, meropenem-clavulanate, TBA-7371 a decaprenylphosphoryl-β-D-ribose 2'-oxidase (DprE1) Inhibitor, OPC-167832, Telacebec (Q203) and thioridazine.

13. A compound of Formula I

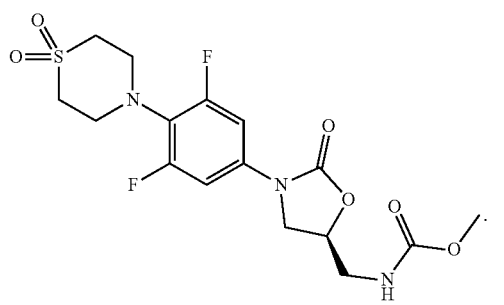

(I)

14. A pharmaceutical composition which comprises a therapeutically effective amount of the compound of claim 13 and a pharmaceutically acceptable carrier.

15. A method for treating a bacterial infection which comprises administering to a subject in need of such treatment a therapeutically effective amount of the compound of claim 13.

16. A method for treating a bacterial infection which comprises administering to a subject in need of such treatment the pharmaceutical composition according to claim 14.

17. The method of claim 15, wherein the bacterial infection is due to *Mycobacterium tuberculosis*.

18. The method of claim 16, wherein the bacterial infection is due to *Mycobacterium tuberculosis*.

19. The method of claim 15, wherein the compound is administered orally, parenterally, or topically.

20. The method of claim 16, wherein the pharmaceutical composition is administered orally, parenterally, or topically.

21. The method of claim 17, wherein the *Mycobacterium tuberculosis* is a drug resistant mycobacterial strain.

22. The method of claim 18, wherein the *Mycobacterium tuberculosis* is a drug resistant mycobacterial strain.

23. The method of claim 17, further comprising the step of administering a second therapeutic agent for treating *Mycobacterium tuberculosis*.

24. The method of claim 23, wherein the second therapeutic agent is selected from the group consisting of: ethambutol, pyrazinamide, isoniazid, levofloxacin, moxifloxacin, gatifloxacin, ofloxacin, kanamycin, amikacin, capreomycin, streptomycin, ethionamide, prothionamide, cycloserine, terididone, para-aminosalicylic acid, clofazimine, clarithromycin, amoxicillin-clavulanate, pretomanid, bedaquiline, GSK 3036656, gepotidacin, thiacetazone, meropenem-clavulanate, TBA-7371 a decaprenylphosphoryl-β-D-ribose 2'-oxidase (DprE1) Inhibitor, OPC-167832, Telacebec (Q203) and thioridazine.

\* \* \* \* \*

UNITED STATES PATENT AND TRADEMARK OFFICE
CERTIFICATE OF CORRECTION

| | | |
|---|---|---|
| PATENT NO. | : 12,435,077 B2 | Page 1 of 1 |
| APPLICATION NO. | : 17/909834 | |
| DATED | : October 7, 2025 | |
| INVENTOR(S) | : Brendan M. Crowley et al. | |

It is certified that error appears in the above-identified patent and that said Letters Patent is hereby corrected as shown below:

On the Title Page

Item (22), PCT filing data:
Change --Mar. 20, 2021-- to "Mar. 17, 2021"

Signed and Sealed this
Second Day of December, 2025

John A. Squires
*Director of the United States Patent and Trademark Office*